United States Patent
Kahnt et al.

(10) Patent No.: US 10,850,620 B2
(45) Date of Patent: Dec. 1, 2020

(54) OPERATING METHOD FOR A DUAL-VOLTAGE BATTERY

(71) Applicant: HELLA GmbH & Co. KGaA, Lippstadt (DE)

(72) Inventors: Sebastian Kahnt, Karlstadt (DE); André Koerner, Lippstadt (DE); Hans Joachim Liebscher, Wuerzburg (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/419,533

(22) Filed: May 22, 2019

(65) Prior Publication Data

US 2019/0273389 A1 Sep. 5, 2019

Related U.S. Application Data

(63) Continuation of application No. PCT/EP2017/079451, filed on Nov. 16, 2017.

(30) Foreign Application Priority Data

Nov. 22, 2016 (DE) ........................ 10 2016 122 453

(51) Int. Cl.
*H02J 7/00* (2006.01)
*B60L 7/10* (2006.01)
(Continued)

(52) U.S. Cl.
CPC ................. *B60L 7/10* (2013.01); *B60L 50/66* (2019.02); *B60L 53/62* (2019.02); *B60L 58/12* (2019.02);
(Continued)

(58) Field of Classification Search
USPC .................................................. 320/125, 118
See application file for complete search history.

(56) References Cited

U.S. PATENT DOCUMENTS 5,631,534 A * 5/1997 Lewis ................. H01M 10/441
320/103
5,844,325 A * 12/1998 Waugh ................ H01M 10/122
307/10.7

(Continued)

FOREIGN PATENT DOCUMENTS

DE 1120495 B 12/1961
DE 10055531 A1 1/2002

(Continued)

OTHER PUBLICATIONS

International Search Report dated Feb. 15, 2018 in corresponding application PCT/EP2017/079451.

*Primary Examiner* — Samuel Berhanu
(74) *Attorney, Agent, or Firm* — Muncy, Geissler, Olds & Lowe, P.C.

(57) ABSTRACT

An operating method for a dual-voltage battery of a vehicle includes a plurality of battery cell blocks and a battery electronic system with a plurality of power switching elements for optionally connecting individual, in any case individual battery cell blocks, in parallel and/or in series, wherein a first battery cell block and at least one additional battery cell block of a group of battery cell blocks are connected in parallel in a first connection arrangement in order to provide a first voltage and in series in a second connection arrangement in order to provide a second voltage, wherein a parallel connection switch and a series connection switch are associated with the first battery cell block of the group of battery cell blocks to produce the parallel and/or series connection.

18 Claims, 4 Drawing Sheets

(51) Int. Cl.
*B60L 50/60* (2019.01)
*B60L 53/62* (2019.01)
*H02J 7/14* (2006.01)
*B60L 58/19* (2019.01)
*B60L 58/22* (2019.01)
*B60L 58/21* (2019.01)
*H01M 10/44* (2006.01)
*B60L 58/12* (2019.01)
*H02J 1/08* (2006.01)
*B60L 58/20* (2019.01)
*H01M 10/48* (2006.01)

(52) U.S. Cl.
CPC .............. *B60L 58/19* (2019.02); *B60L 58/20* (2019.02); *B60L 58/21* (2019.02); *B60L 58/22* (2019.02); *H01M 10/441* (2013.01); *H01M 10/482* (2013.01); *H02J 1/08* (2013.01); *H02J 7/0024* (2013.01); *H02J 7/0031* (2013.01); *H02J 7/00043* (2020.01); *H02J 7/14* (2013.01); *H02J 7/1423* (2013.01); *H02J 7/1461* (2013.01); *B60L 2240/547* (2013.01); *B60L 2260/22* (2013.01); *B60L 2260/24* (2013.01); *B60L 2260/26* (2013.01); *H01M 2220/20* (2013.01); *H02J 1/082* (2020.01); *Y02T 10/70* (2013.01)

(56) References Cited

U.S. PATENT DOCUMENTS

| | | | |
|---|---|---|---|
| 2011/0001442 A1* | 1/2011 | Lee | B62M 6/45 318/139 |
| 2012/0013180 A1* | 1/2012 | Muto | H02J 7/0024 307/9.1 |
| 2014/0285003 A1 | 9/2014 | Mueller | |
| 2018/0109122 A1 | 4/2018 | Koerner | |

FOREIGN PATENT DOCUMENTS

| | | |
|---|---|---|
| DE | 102005051003 A1 | 4/2007 |
| DE | 102013113182 A1 | 5/2015 |
| DE | 102015104293 A1 | 9/2016 |

* cited by examiner

OPERATING METHOD FOR A DUAL-VOLTAGE BATTERY

This nonprovisional application is a continuation of International Application No. PCT/EP2017/079451, which was filed on Nov. 16, 2017, and which claims priority to German Patent Application No. 10 2016 122 453.7, which was filed in Germany on Nov. 22, 2016, and which are both herein incorporated by reference.

BACKGROUND OF THE INVENTION

Field of the Invention

The present invention relates to an operating method for a dual-voltage battery of a vehicle.

Description of the Background Art

A dual-voltage battery designed to carry out the generic operating method is known from DE 10 2013 113 182 A1. Provision is made here to arrange a first group of battery cell blocks and a second group of battery cell blocks in parallel. A first voltage or a greater second voltage can then be provided by the means that the battery cell blocks are connected within the group in parallel in a first connection arrangement and in series in the second connection arrangement. To implement the switchover, power switching elements are associated with the battery cell blocks. These elements can be bidirectional semiconductor switches or relays, for example.

SUMMARY OF THE INVENTION

It is therefore an object of the present invention to provide an improved operating method for a dual-voltage battery that allows improved utilization of a storage capacity of the dual-voltage battery.

To attain the object, certain exemplary embodiments of the invention provide an operating method for a dual-voltage battery of a vehicle comprising a multiplicity of battery cell blocks and comprising a battery electronic system with a plurality of power switching elements for optionally connecting individual, at least individual battery cell blocks, in parallel and/or in series, wherein a first battery cell block and at least one additional battery cell block of a group of battery cell blocks are connected in parallel in a first connection arrangement in order to provide a first voltage and in series in a second connection arrangement in order to provide a second voltage, wherein a parallel connection switch and a series connection switch are associated with the first battery cell block of the group of battery cell blocks to produce the parallel and/or series connection and wherein at least one third battery cell block can be connected in parallel to the group of battery cell blocks in the first connection arrangement and in the second connection arrangement, wherein in the second connection arrangement, in which closing the series connection switch of the first battery cell block connects the same in series with the at least one additional battery cell block of the group of battery cell blocks, the parallel connection switch of the first battery cell block is brought into a closed position or into an open position as a function of an operating state of the vehicle, wherein in the closed position the first battery cell block of the group of battery cell blocks is connected in parallel with the at least one third battery cell block.

The particular advantage of the invention is that at least the first battery cell block of the group of battery cell blocks in the second connection arrangement can increase the capacity of the third battery cell blocks intended for the provision of the first voltage and can stabilize the supply of power at the first voltage. For this purpose, the first battery cell block is connected in parallel with the third battery cell blocks by closing the parallel connection switch and at the same time is in a series connection with the additional battery cell blocks of the group of battery cell blocks. In addition to the improvement in capacity, moreover, the flow of current through the battery cell blocks providing the first voltage is reduced, and the total electrical resistance of the series arrangement is decreased. A potential for energy recovery is improved in this respect, since an ability to accept current at the second voltage is improved. The flow of current through the first battery cell block during energy recovery is likewise reduced, since a recovery current flows proportionally and directly through the at least one third battery cell block. The service life of the battery cell blocks is extended overall as a result.

According to a preferred embodiment of the invention, the transfer of the parallel connection switch of the first battery cell block into the closed position and/or into the open position takes place as a function of a driving state of the vehicle and/or a battery state and/or a load state. The driving state, the battery state, and/or the load state are operating states in the meaning of the invention or of claim 1 in this respect. A closing or opening of the parallel connection switch that is dependent on the driving state takes place, for example, during acceleration, stopping, parking, active engine-off coasting, or in the energy recovery state. Active engine-off coasting occurs when an internal combustion engine in a hybrid vehicle is switched off during travel and the vehicle speed is kept constant by an electric drive. In the energy recovery state, braking energy of the vehicle, in particular, is converted into electrical energy by a generator and fed into the dual-voltage battery. It is necessary here to distinguish between energy recovery to a moderate degree—this occurs when the current arising during energy recovery does not critically increase either the first or the second voltage—and intense energy recovery. This occurs when the current arising during energy recovery can result in a critical increase in the first voltage.

According to an improvement of the invention, a measurement of current and/or voltage is carried out at a first terminal of the dual-voltage battery at which the first voltage is present. The parallel connection switch is closed in the second connection arrangement when a current supplied at the first voltage is less than a first lower limit current or is greater than a first upper limit current or when the first voltage is less than a first minimum voltage level or when an electrical load operated at the first voltage gives advance notice of an increased demand for current. It is advantageously made possible in this way to provide the first battery cell block for provision of the second voltage as well as to support or to stabilize supply at the first voltage through the parallel connection of said battery cell block with the at least one third battery cell block. Especially in situations in which electrical loads that are operated at the first voltage have an increased power demand, a critical operating state can be prevented in this way.

According to an improvement of the invention, the first current and the first voltage are measured at the first terminal, and the parallel connection switch is opened in the second connection arrangement when the current supplied at the first voltage is greater than the first lower limit current and is less than the first upper limit current and when the first voltage is greater than the first minimum voltage limit and when no electrical load operated at the first voltage reports an increased current demand. Advantageously, by this means a further stabilization of the supply of electric power is achieved in accordance with demand and as a function of the battery state or of the load state or of the operating state of the vehicle.

According to an improvement of the invention, the current and the voltage are measured at a second terminal of the dual-voltage battery associated with the second voltage. In the second connection arrangement, the parallel connection switch is closed when a current provided at the second voltage is less than a second upper limit current and is greater than a second lower limit current and when the second voltage is less than a second maximum voltage limit and is greater than a second minimum voltage limit and when no electrical load operated at the second voltage gives advance notice of an increased demand for current. Advantageously, supply to the electrical loads at the second voltage, in particular, can be accomplished reliably in this manner. In this regard, the parallel connection switch is closed in those circumstances when previously defined limits for the charge or discharge current of the dual-voltage battery are not exceeded or when no impermissibly high or low voltages are detected.

According to an improvement of the invention, the parallel connection switch in the second connection arrangement is opened when the current provided at the second voltage is greater than the second upper limit current or when the current provided at the second voltage is less than the second lower limit current or when the second voltage is greater than a second maximum voltage limit or when the second voltage is less than a second minimum voltage limit or when an electrical load operated at the second voltage gives advance notice of an increased demand for current. It is advantageously ensured through the algorithm for opening the parallel connection switch that the effects for the electrical loads operated at the first voltage are reduced by removing the parallel arrangement of the first battery cell block in the event of heavy present or impending loading of the dual-voltage battery at the second voltage. The second voltage is then provided by the first battery cell block and the at least one additional battery cell block, while the first voltage is provided by the at least one third battery cell block. Interactions in the supply of power are counteracted in this respect.

Additional advantages, features, and details of the invention are evident from the additional dependent claims and the description below. Features mentioned therein can each be essential for the invention individually or in any desired combination. The drawings serve merely to clarify the invention by way of example and are not restrictive in nature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

The invention is explained in detail below on the basis of the attached drawings. They show.

DETAILED DESCRIPTION

Figure 1:
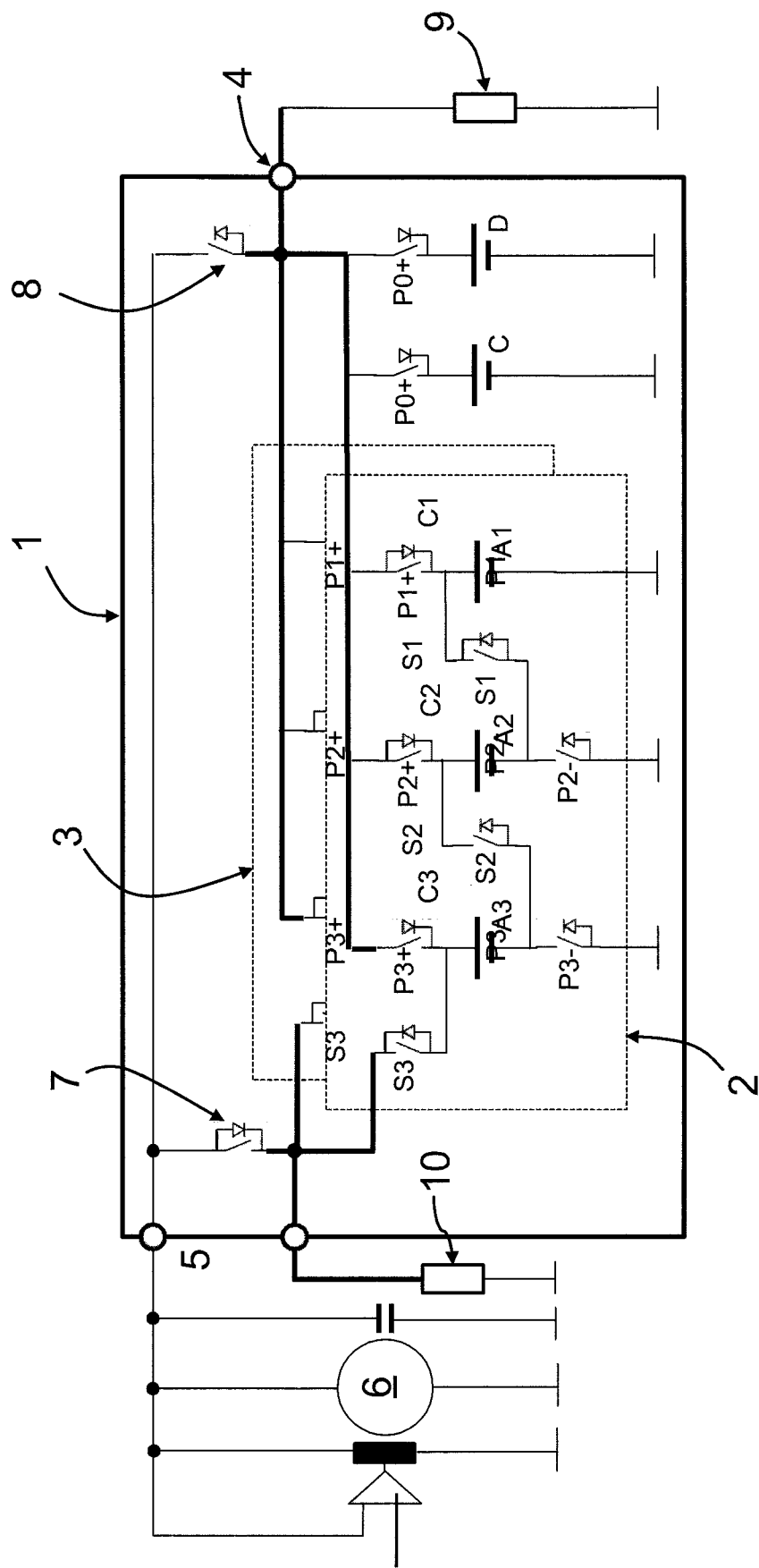
FIG. 1 is a schematic circuit diagram of a dual-voltage battery according to the invention for a vehicle.

A dual-voltage battery 1 according to FIG. 1 includes a total of eight battery cell blocks A1, A2, A3, C, D. Of the total of eight battery cell blocks A1, A2, A3, C, D, a first battery cell block A1 and two additional battery cell blocks A2, A3 form a first group 2 of battery cell blocks A1, A2, A3. Two third battery cell blocks C, D and a second group 3 with three additional battery cell blocks, which is shown as hidden in the schematic circuit diagram in FIG. 1, are connected in parallel with the first group 2 of battery cell blocks A1, A2, A3.

As power switching elements, parallel connection switches P0+, P1+, P2+, P3+, P2−, P3− and series connection switches S1, S2, S3 are associated with the battery cell blocks A1, A2, A3, C, D. These elements can be implemented, in particular, as bidirectional semiconductor switches or relays. The association of the power switching elements P0+, P1+, P2+, P3+, P2−, P3−, S1, S2, S3 with the battery cell blocks A1, A2, A3, C, D takes place in such a manner that, in a first connection arrangement, the first battery cell block A1 and the additional battery cell blocks A2, A3 of the first group 2 and of the second group 3 of battery cell blocks A1, A2, A3 are connected in parallel with the third battery cell blocks C, D. In the first connection arrangement, a first voltage is provided at a first terminal 4 of the dual-voltage battery 1. In a second connection arrangement, the first battery cell block A1 and the additional battery cell blocks A2, A3 of the first group 2 of battery cell blocks A1, A2, A3 and of the second group 3 of battery cell blocks are connected in series with one another. In the second connection arrangement, a higher second voltage is provided at a second terminal 5 of the dual-voltage battery 1. Optionally, in the second connection arrangement, the first voltage can be provided in addition at the first terminal 4.

A starter-generator 6 is associated with the dual-voltage battery 1. The starter-generator 6 can be optionally connected through a first power switching element 7 at the second voltage and/or a second power switching element 8 at the first voltage. The starter-generator 6 can be operated by the dual-voltage battery 1 or can be used in generator mode to convert braking energy into electrical energy and feed it into the dual-voltage battery 1.

At least one first electrical load 9 that is operated at the first voltage is connected to the first terminal 4 of the dual-voltage battery 1. At least one second electrical load 10 that is operated at the second voltage can be connected in analogous fashion to the second terminal 5 of the dual-voltage battery 1. Optionally, means for carrying out a voltage and current measurement can be provided at the first terminal 4 and/or at the second terminal 5 for the purpose of measurement of the first voltage and/or the second voltage and of a current provided for the at least one first electrical load 9 and/or of an electric current provided for the at least one second electrical load 10.

In order to optimally utilize in operation a capacity that is provided by the dual-voltage battery 1, intelligent actuation of the parallel connection switch P1+ associated with the first battery cell block A1 is provided in accordance with the invention. It is the case here that the parallel connection switch P1+ of the first battery cell block A1 can be opened or closed as a function of operating state in the second connection arrangement in which the battery cell blocks A1, A2, A3 combined into the first group 2 are connected in series and the second voltage is provided at the second terminal 5. Possibilities here for the operating state are, in particular, a driving state of the vehicle, a battery state of the dual-voltage battery 1, or a load state of an electrical system of the vehicle having the first electrical load 9 and the second electrical load 10.

The operating method in accordance with the invention for the dual-voltage battery 1 is explained below on the basis of four state diagrams by way of example. It is assumed here that 12V is provided as the first voltage and 48V is provided as the second voltage by the dual-voltage battery 1.

Figure 2:
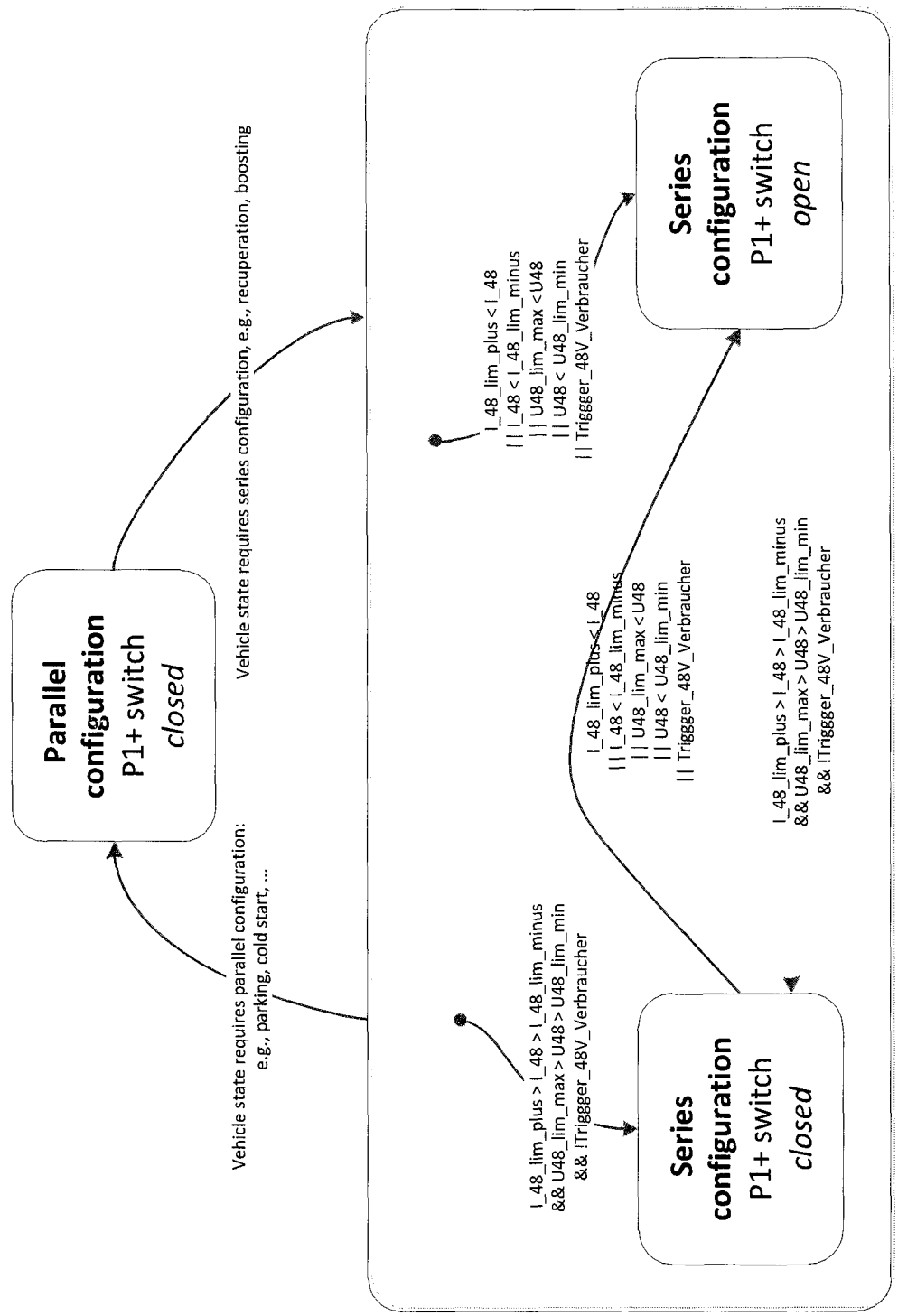
FIG. 2 is a first state diagram for the dual-voltage battery from FIG. 1.

FIG. 2 shows a first state diagram for the operating method according to the invention for the dual-voltage battery 1. It is the case here that the parallel connection switch P1+ of the first battery cell block A1 is usually closed in a parallel configuration (first connection arrangement) of the battery cell blocks A1, A2, A3. In a series configuration (second connection arrangement) of the dual-voltage battery 1, in contrast, the parallel connection switch P1+ is either open or closed as a function of operating state. In particular, the parallel connection switch P1+ is closed when a current I_48 provided at the second voltage U48 is less than a second upper limit current I_48_lim_plus and is greater than a first lower limit current I_48_lim_minus and when the second voltage U48 is less than a second maximum voltage level U48_lim_max and is greater than a second minimum voltage level U48_lim_min and when no electrical load 10 operated at the second voltage U48 gives advance notice of an increased demand for current I_48. The parallel connection switch P1+, in contrast, is opened when the current I_48 provided at the second voltage U48 is greater than the second upper limit current I_48_lim_plus or when the current I_48 provided at the second voltage U48 is less than the second lower limit current I_48_lim_minus or when the second voltage U48 is greater than the second maximum voltage level U48_lim_max or when the second voltage U48 is less than the second minimum voltage limit U48_lim_min or when the at least one electrical load 10 operated at the second voltage U48 gives advance notice of an increased demand for current I_48. In this respect, voltage and current limits I_48_lim_plus, I_48_lim_minus, U48_lim_max, U48_lim_min are defined, and a charge or discharge current for dual-voltage battery 1 as well as the magnitude of the second voltage U48 can be determined by the measurement unit associated with the second terminal 5. In this regard, the parallel connection switch P1+ for the first battery cell block A1 is deactivated or is opened when the limits for the current and at which the voltage are violated and also when intelligent loads 10 in the 48V vehicle electrical system of the dual-voltage battery 1 report a large current draw early enough before the same through communication. Consequently, the dual-voltage battery 1 can decouple the vehicle electrical systems in advance of the large current draw if the defined limits would otherwise be positively or negatively exceeded or if this is to be expected. With the method according to the invention, the 12V vehicle electrical system can thus be disconnected from the 48V vehicle electrical system and stabilized in critical operating situations of the same.

Figure 3:
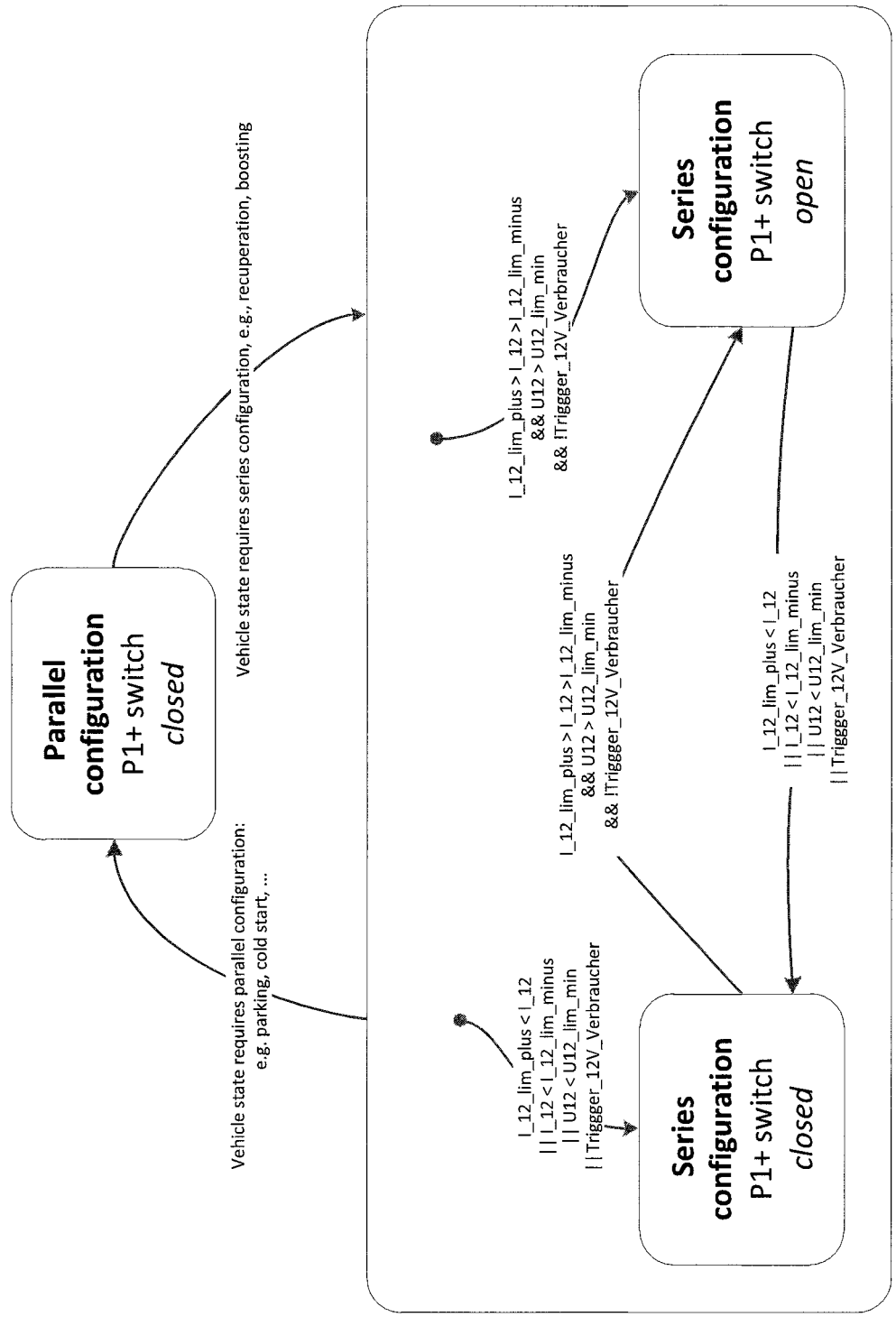
FIG. 3 is a second state diagram for the dual-voltage battery from FIG. 1.

Further stabilization for the 12V vehicle electrical system results in accordance with the state diagram from FIG. 3 when, in the series configuration, the parallel connection switch P1+ is closed if a current I_12 provided at the first voltage U12 is less than a first lower limit current I_12_lim_minus or when the current I_12 provided at the first voltage U12 is greater than a first upper limit current I_12_lim_plus or when the first voltage U12 is less than a first minimum voltage limit U12_lim_min or when an electrical load 9 operated at the first voltage U12 gives advance notice of an increased demand for current I_12. In contrast, the parallel connection switch P1+ is opened when the electric current I_12 operated at the first voltage U12 is greater than the first lower limit current I_12_lim_minus and is less than the first upper limit current I_12_lim_plus and when the first voltage U12 is greater than the first minimum voltage limit U12_lim_min and when no electrical load 9 operated at the first voltage U12 gives advance notice of an increased demand for current I_12. According to the invention, in this regard the result is achieved of adapting the capacity for the 12V vehicle electrical system in accordance with demand and, in particular, increasing it. Safety-critical loads 9 in the 12V vehicle electrical system can be supplied reliably with electric power in this regard, and critical driving states avoided.

In the series configuration (second connection arrangement) of the dual-voltage battery 1, moreover, it is possible to provide an actuation of the parallel connection switch P1+ for special driving states. For example, the parallel connection switch P1+ for decoupling the vehicle electrical systems is opened when the vehicle accelerates sharply, actively coasts with the engine off, or when a high degree of energy recovery is present. During normal travel, during parking, or during normal energy recovery, in contrast, the parallel connection switch P1+ for the first battery cell block A1 is closed.

Figure 5:
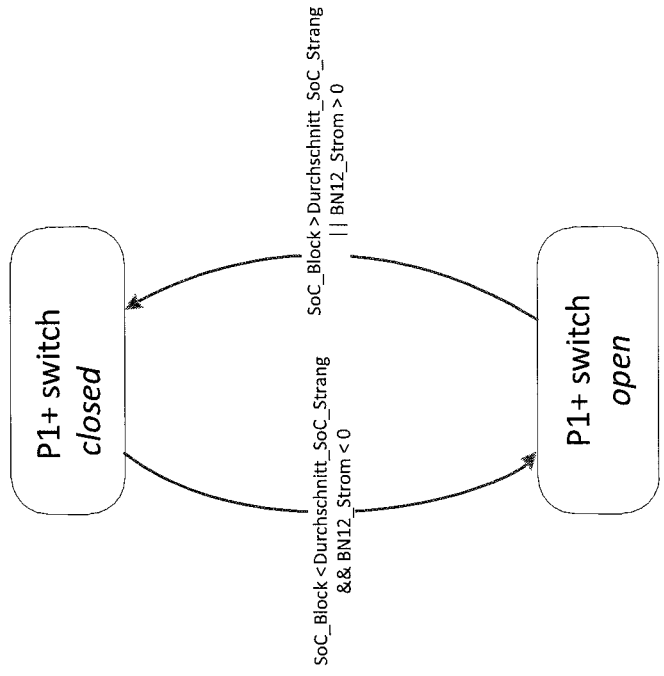
FIG. 5 is a fourth state diagram for the dual-voltage battery from FIG. 1.
Figure 4:
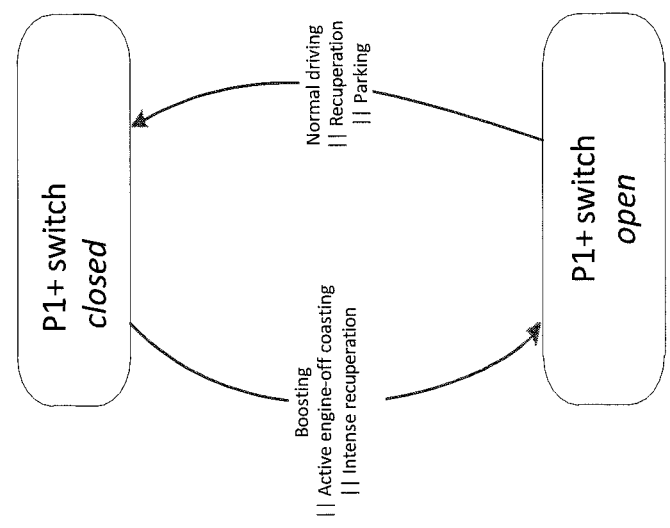
FIG. 4 is a third state diagram for the dual-voltage battery from FIG. 1.

FIG. 5 shows a state diagram for the first connection arrangement (parallel configuration) of the battery cell blocks A1, A2, A3, C, D. It is the case here that it is possible to balance different charge state levels for the battery cell blocks A1, A2, A3, C, D by opening or closing the parallel connection switch P1+ in accordance with demand. For example, the first battery cell block A1 of the first group 2 of battery cell blocks A1, A2, A3 can have a lower charging state than the additional battery cell blocks A2, A3 of the groups 2 of battery cell blocks A2, A3, since they are not charged as strongly in the energy recovery state as the additional battery cell blocks A2, A3 of the first group 2 of battery cell blocks A1, A2, A3 when the parallel connection switch P1+ is closed in the series configuration. On the other hand, the first battery cell blocks A1 can have a higher charge state than the additional battery cell blocks A2, A3 of the first group 2 of battery cell blocks A1, A2, A3, since the block current through the additional battery cell blocks A2, A3 is especially high when the parallel connection switch P1+ is closed and there is a high loading in the 48V vehicle electrical system, such as during acceleration. In order to balance charging differences between the battery cell blocks A1, A2, A3, C, D, the parallel connection switch P1+ and any additional parallel connection switches P0+, P2+, P3+ can be opened during a power draw in the first connection arrangement (parallel configuration) so that a uniform charging balance is established for the different battery cell blocks A1, A2, A3, C, D. For example, the parallel connection switch P1+ for the first battery cell block A1 in the parallel configuration is opened when an energy recovery situation is present and the charge state for the first battery cell block A1 is less than an average charge state of the battery cell blocks A1, A2, A3 of the first group 2 of battery cell block A1, A2, A3. Analogously, the parallel connection switch P1+ is closed when the charge state for the battery cell block A1 is greater than an average charge state in the first group 2 of battery cell blocks A1, A2, A3 or no energy recovery situation is present.

The same components and component functions are labeled with the same reference symbols.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. An operating method for a dual-voltage battery of a vehicle comprising:
   a plurality of battery cell blocks; and
   a battery electronic system with a plurality of power switching elements for connecting individual, at least individual battery cell blocks, in parallel or in series,
   wherein a first battery cell block and at least one additional battery cell block of a group of battery cell blocks are connected in parallel in a first connection arrangement in order to provide a first voltage and in series in a second connection arrangement in order to provide a second voltage,
   wherein a parallel connection switch and a series connection switch are associated with the first battery cell block of the group of battery cell blocks to-produce the parallel and/or series connection,
   wherein the first connection arrangement and the second connection arrangement are configured to connect at least one third battery cell block in parallel to the group of battery cell blocks,
   wherein the second connection arrangement, in which the first battery cell block is connected in series with the at least one additional battery cell block of the group of battery cell blocks by closing the series connection switch, the parallel connection switch of the first battery cell block is transferred either into a closed position or into an open position as a function of an operating state of the vehicle,
   wherein in the closed position the first battery cell block of the group of battery cell blocks is connected in parallel with the at least one third battery cell block, and
   wherein a measurement of current and/or voltage is carried out at a first terminal of the dual-voltage battery associated with the first voltage, and the parallel connection switch is closed in the second connection arrangement when any of the following conditions are met:
      a current supplied at the first voltage is less than a first lower limit current;
      the current supplied at the first voltage is greater than a first upper limit current;
      the first voltage is less than a first minimum voltage limit; and
      an electrical load operated at the first voltage gives advance notice of an increased demand for current.

2. The operating method according to claim 1, wherein the transfer of the parallel connection switch of the first battery cell block into the closed position and/or into the open position takes place as a function of a driving state and/or of a battery state and/or of a load state.

3. The operating method according to claim 1, wherein a measurement of current and/or voltage is carried out at a second terminal of the dual-voltage battery associated with the second voltage, and in that the parallel connection switch is closed in the second connection arrangement when a current supplied at the second voltage is less than a second upper limit current and is greater than a second lower limit current and when the second voltage is less than a second maximum voltage limit and is greater than a second minimum voltage limit and when no electrical load operated at the second voltage gives advance notice of an increased demand for current.

4. The operating method according to claim 1, wherein a measurement of current and/or voltage are measured at the second terminal of the dual-voltage battery, and in that the parallel connection switch is opened in the second connection arrangement when the current supplied at the second voltage is greater than the second upper limit current or when the current supplied at the second voltage is less than the second lower limit current or when the second voltage is greater than the second maximum voltage limit or when the second voltage is less than the second minimum voltage limit or when an electrical load operated at the second voltage gives advance notice of an increased demand for current.

5. The operating method according to claim 1, wherein the parallel connection switch is closed in the second connection arrangement of the dual-voltage battery when the vehicle stops or a degree of energy recovery is performed in which the current arising during energy recovery does not critically increase either the first voltage or the second voltage.

6. The operating method according to claim 1, wherein the dual-voltage battery is transferred into the first connection arrangement and the parallel connection switch is closed during cold starting of the vehicle and/or during parking of the vehicle.

7. The operating method according to claim 1, wherein, in the second connection arrangement of the dual-voltage battery, the parallel connection switch is opened when the vehicle is accelerated sharply or intense energy recovery is performed or the vehicle is operated in the driving state of active engine-off coasting.

8. The operating method according to claim 1, wherein, in the second connection arrangement of the dual-voltage battery, the parallel connection switch is opened when the vehicle is driven by electric motor.

9. The operating method according to claim 1, wherein, in the first connection arrangement of the dual-voltage battery, a charge state of the different battery cell blocks is balanced by the demand-based opening and/or closing of the parallel connection switch.

10. An operating system for a dual-voltage battery of a vehicle, the system comprising:
    a first battery cell block and at least one additional battery cell block of the plurality of cell blocks connected in parallel in a first connection arrangement in order to provide a first voltage and in series in a second connection arrangement in order to provide a second voltage; and
    a battery electronic system comprising:

a first parallel connection switch and a first series connection switch associated with the first battery cell block of the group of battery cell blocks to produce the parallel or series connection; and two second parallel connection switches and a second series connection switch associated with the at least one additional battery cell block of the group of battery cell blocks, the two second parallel connection switches being connected to opposite terminals of the at least one additional battery cell block of the group of battery cell blocks, wherein at least one terminal of the first battery cell block is connected to ground and an opposite terminal of the first battery cell block is connected to the first parallel connection switch of the first battery cell block, wherein in the first connection arrangement all of the parallel connection switches are closed and all of the series connection switches are open and in the second connection arrangement all of the parallel switches are open and all of the series connection switches are closed, wherein the second connection arrangement, in which the first battery cell block is connected in series with the at least one additional battery cell block of the group of battery cell blocks by closing the series connection switches, the first parallel connection switch of the first battery cell block is transferred either into a closed position or into an open position as a function of an operating state of the vehicle while maintaining all of the series connection switches closed, wherein in the closed position the first battery cell block of the group of cell blocks is connected in parallel with at least one third battery cell block, and wherein a measurement of current and/or voltage is carried out at a first terminal of the dual-voltage battery associated with the first voltage, and the first parallel connection switch is closed in the second connection arrangement when any of the following conditions are met:

a current supplied at the first voltage is less than a first lower limit current;

the current supplied at the first voltage is greater than a first upper limit current;

the first voltage is less than a first minimum voltage limit; and an electrical load operated at the first voltage gives advance notice of an increased demand for current.

11. The operating method according to claim 10, wherein the transfer of the first parallel connection switch of the first battery cell block into the closed position and/or into the open position takes place as a function of a driving state and/or of a battery state and/or of a load state.

12. The operating method according to claim 10, wherein a measurement of current and voltage is carried out at a second terminal of the dual-voltage battery associated with the second voltage, and in that the first parallel connection switch is closed in the second connection arrangement when a current supplied at the second voltage is less than a second upper limit current and is greater than a second lower limit current and when the second voltage is less than a second maximum voltage limit and is greater than a second minimum voltage limit and when no electrical load operated at the second voltage gives advance notice of an increased demand for current.

13. The operating method according to claim 10, wherein the current and the voltage are measured at the second terminal of the dual-voltage battery, and in that the parallel connection switches are opened in the second connection arrangement when the current supplied at the second voltage is greater than the second upper limit current or when the current supplied at the second voltage is less than the second lower limit current or when the second voltage is greater than the second maximum voltage limit or when the second voltage is less than the second minimum voltage limit or when an electrical load operated at the second voltage gives advance notice of an increased demand for current.

14. The operating method according to claim 10, wherein the parallel connection switches are closed in the second connection arrangement of the dual-voltage battery when the vehicle stops or a degree of energy recovery is performed in which the current arising during energy recovery does not critically increase either the first voltage or the second voltage.

15. The operating method according to claim 10, wherein the dual-voltage battery is transferred into the first connection arrangement and the parallel connection switches are closed during cold starting of the vehicle and/or during parking of the vehicle.

16. The operating method according to claim 10, wherein, in the second connection arrangement of the dual-voltage battery, the parallel connection switches are opened when the vehicle is accelerated sharply or intense energy recovery is performed or the vehicle is operated in the driving state of active engine-off coasting.

17. The operating method according to claim 10, wherein, in the second connection arrangement of the dual-voltage battery, the parallel connection switches are opened when the vehicle is driven by electric motor.

18. The operating method according to claim 10, wherein, in the first connection arrangement of the dual-voltage battery, a charge state of the different battery cell blocks is balanced by the demand-based opening and/or closing of the parallel connection switches.

* * * * *